(12) United States Patent
Higashi et al.

(10) Patent No.: US 9,211,509 B2
(45) Date of Patent: Dec. 15, 2015

(54) REVERSE OSMOSIS MEMBRANE FOR WASTEWATER TREATMENT

(75) Inventors: Masao Higashi, Ohtsu (JP); Junsuke Morita, Ohtsu (JP); Tooru Kitagawa, Otsu (JP)

(73) Assignee: TOYOBO CO., LTD., Osaka-shi (JP)

( * ) Notice: Subject to any disclaimer, the term of this patent is extended or adjusted under 35 U.S.C. 154(b) by 194 days.

(21) Appl. No.: 14/117,402

(22) PCT Filed: Jun. 14, 2012

(86) PCT No.: PCT/JP2012/065241
§ 371 (c)(1),
(2), (4) Date: Nov. 13, 2013

(87) PCT Pub. No.: WO2013/005551
PCT Pub. Date: Jan. 10, 2013

(65) Prior Publication Data
US 2015/0136692 A1  May 21, 2015

(30) Foreign Application Priority Data

Jul. 4, 2011 (JP) ................. 2011-148167
Mar. 22, 2012 (JP) ................. 2012-064697

(51) Int. Cl.
*B01D 39/00* (2006.01)
*B01D 39/14* (2006.01)
(Continued)

(52) U.S. Cl.
CPC ............. *B01D 71/68* (2013.01); *B01D 69/02* (2013.01); *B01D 69/141* (2013.01); *C02F 1/441* (2013.01); *B01D 61/025* (2013.01)

(58) Field of Classification Search
CPC .. B01D 71/68; B01D 69/02; B01D 2325/022; B01D 2325/36; B01D 61/025; B01D 69/08; B01D 67/0016
USPC ................................................. 210/500.41
See application file for complete search history.

(56) References Cited

U.S. PATENT DOCUMENTS 4,990,252 A * 2/1991 Tomaschke et al. ...... 210/321.83
5,246,582 A * 9/1993 Sluma et al. .............. 210/500.23
8,752,714 B2 * 6/2014 Mickols et al. ........... 210/500.37

FOREIGN PATENT DOCUMENTS

JP     62-201603 A     9/1987
JP     03000120    *   5/1989
(Continued)

OTHER PUBLICATIONS

Chan Hyun Lee et al., Disulfonated poly (arylene ether sulfone) random copolymer thin film composite membrane fabricated using a benign solvent for reverse osmosis applications, Journal of Membrane Science 389 (2012)363-371.*
(Continued)

*Primary Examiner* — Ana Fortuna
(74) *Attorney, Agent, or Firm* — Westerman, Hattori, Daniels & Adrian, LLP

(57) ABSTRACT

To provide a reverse osmosis membrane where both salt rejection rate and water permeability required for wastewater treatment are achieved in a high level in spite of using the materials having excellent resistance to chemicals (resistance to alkali and to chlorine). A reverse osmosis membrane for wastewater treatment comprising a sulfonated poly(arylene ether sulfone) polymer containing a constituting component represented by the following formula [I], characterized in that, in a proton nuclear magnetic resonance spectrum where water molecules in the membrane are measured using the reverse osmosis membrane in a water-containing state, the relation between the chemical shift A (ppm) of spectral peak top derived from bound water and the chemical shift B (ppm) of spectral peak top derived from bulk water satisfies $(B-0.36) \leq A < (B-0.30)$:

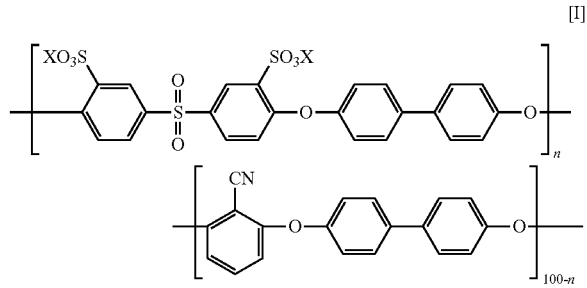

wherein X is H or a univalent cationic species and n is an integer of 10 to 50.

7 Claims, 1 Drawing Sheet

(51) Int. Cl.
*B01D 33/21* (2006.01)
*B01D 63/02* (2006.01)
*C02F 1/44* (2006.01)
*B01D 71/68* (2006.01)
*B01D 69/02* (2006.01)
*B01D 69/14* (2006.01)
*B01D 61/02* (2006.01)

(56) References Cited

FOREIGN PATENT DOCUMENTS

| JP | 03-021333 | A |   | 1/1991 |
|----|-----------|---|---|--------|
| JP | 06-182169 | A |   | 7/1994 |
| JP | 07-67529  | B2 |  | 7/1995 |
| JP | 10-337448 |   | * | 6/1997 |
| JP | 10-57783  | A |   | 3/1998 |
| JP | 2007-063533 | A | | 3/2007 |
| JP | 2009-544831 | A | | 12/2009 |
| JP | 2010-058073 | A | | 3/2010 |
| WO | 2008/012222 | A2 | | 1/2008 |

OTHER PUBLICATIONS

Feng Wang et al, Direct polymerization of sulfonated poly (arylene ether sulfone) rndom (statistical) copolymers: candidates for new proton exchange membranes;Journal of Membrane Science 197(2002) 231-242.*

Notification of Transmittal of Translation of the International Preliminary Report on Patentabililty (Form PCT/IB/338) of International Application No. PCT/JP2012/065241 mailed Jan. 16, 2014 with Forms PCT/IB/373 and PCT/ISA/237.

International Search Report for PCT/JP2012/065241, Mailing Date of Jul. 17, 2012.

* cited by examiner

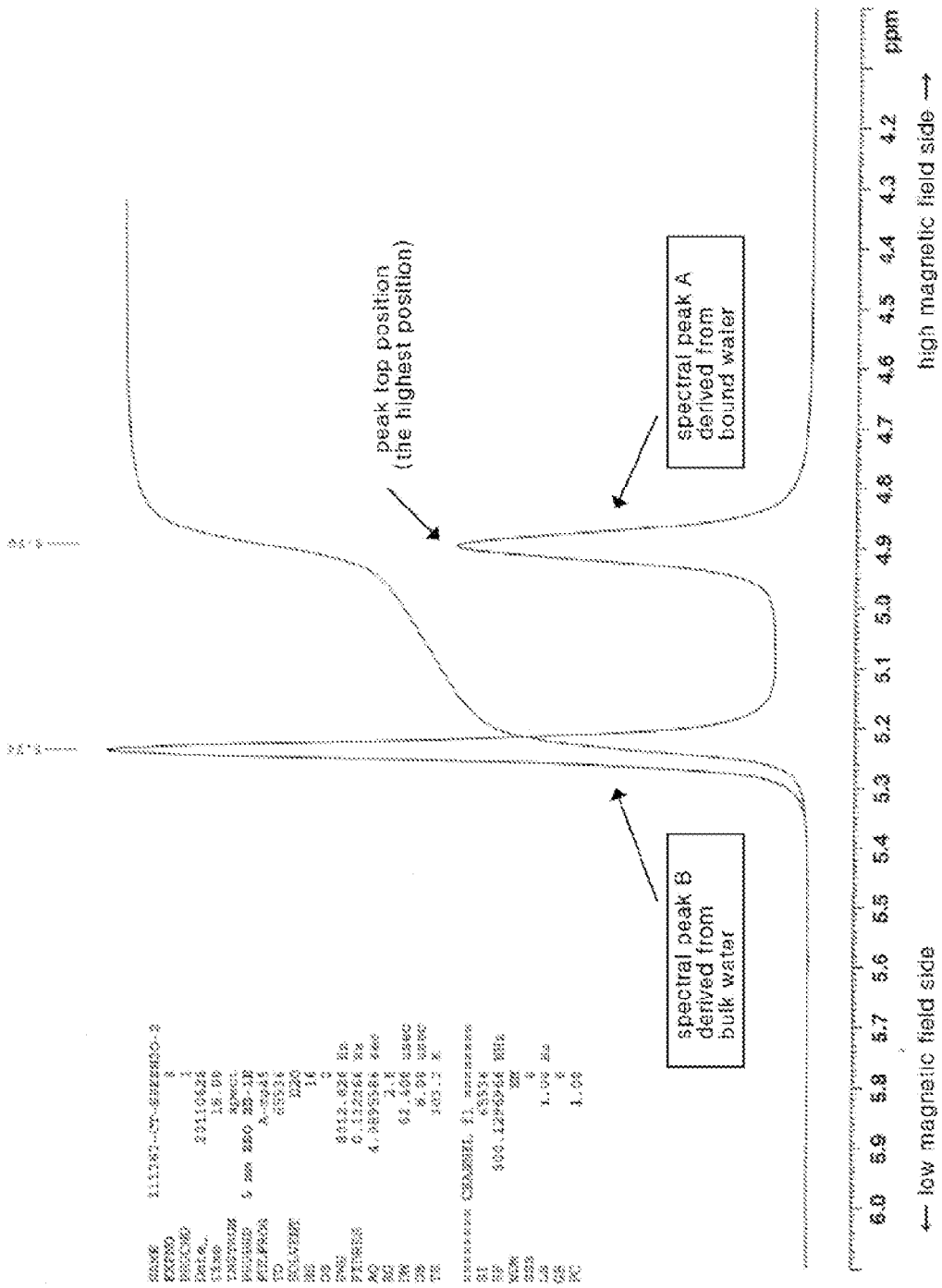

REVERSE OSMOSIS MEMBRANE FOR WASTEWATER TREATMENT

TECHNICAL FIELD OF THE INVENTION

The present invention relates to a reverse osmosis membrane suitable for wastewater treatment where both salt rejection rate and water permeability are achieved in a high level in spite of using the materials having excellent resistance to chemicals.

BACKGROUND ART

In order to operate the reverse osmosis membrane for a long period of time in a stable manner, an appropriate pretreatment such as sterilization of the water to be treated or removal of turbid components and a periodical washing of the membrane are unavoidable. That is because, when fouling components are sedimented on the surface of the osmosis membrane or slime by the growth of microbes is adhered thereon, significant reduction of the property is resulted. Examples of the pretreatment include removal of the scales and the fouling-causing substances by adjustment of pH or by a membrane treatment. Examples of the membrane washing include the use of solution of alkaline chemicals and solution of chlorine-type chemicals or, particularly, sodium hypochlorite.

As to the reverse osmosis membrane which has been commercially used up to now, cellulose triacetate (CTA, Patent Document 1) and aromatic polyamide (PAm, Patent Document 2) are main ones. Although CTA membrane is excellent in its resistance to chlorine as compared with PAm membrane and is particularly excellent in terms of the washing with sodium hypochlorite and the recovery of membrane property, it is weak in terms of resistance to alkali and has a disadvantage that the use of solution of alkali-type chemicals is limited. On the contrary, although PAm membrane is excellent in terms of resistance to alkali as compared with CTA membrane, its resistance to chlorine is very low and it has a disadvantage that the use of solution of chlorine-type chemicals is limited.

To improve those disadvantages, Patent Document 3 proposes a separating membrane using a polymer having a sulfonated poly(aryl ether sulfone) structure. The membrane prepared as such is improved in its resistance to chemicals but, on the other hand, there is a disadvantage that its water permeability is bad and it is not suitable for practical use. For solving this problem, Patent Document 4 attempts that both water permeability/salt rejection rate and chemical durability are achieved by means of thinly coating the sulfonated poly (aryl ether sulfone) on a compounded membrane of a PAm type. According to such a method however, there are problems that it is risky for maintaining the resistance to chemicals for a long period due to its thin coating layer and also that cost becomes high due to an increased complication of the membrane-manufacturing steps.

As mentioned hereinabove, the conventional reverse osmosis membranes have a problem in any of salt rejection rate, water permeability and resistance to chemicals and it is the current status that the product where all of those properties are actualized in a high level has not been available yet.

PRIOR ART DOCUMENTS

Patent Documents

Patent Document 1: Japanese Patent No. 3591618
Patent Document 2: Japanese Patent No. 2794785
Patent Document 3: Japanese Patent Application Pre-Grant (JP-B) No. 67529/95
Patent Document 4: Japanese Patent Application Laid-Open (JP-A) No. 57783/98

DISCLOSURE OF THE INVENTION

Problem that the Invention is to Solve

The present invention has been created in view of the current status of the prior art as such and its object is to provide a reverse osmosis membrane where both salt rejection rate and water permeability required for wastewater treatment are achieved in a high level in spite of using the materials having excellent resistance to chemicals (resistance to alkali and to chlorine).

Means for Solving the Problem

In order to achieve the above object, the present inventors have conducted intensive investigations and found that, when a specific sulfonated poly(arylene ether sulfone) polymer being excellent in resistance to chemicals is used as a material for the reverse osmosis membrane and the position of peak top derived from bound water of this membrane in a water-containing state is controlled within the region of the specific chemical shift value, the sulfonic acid group in the membrane and the bound water undergo an interaction in a favorable manner so that both salt rejection rate and water permeability can be achieved in a high level whereupon the present invention has been accomplished.

Thus, the present invention has the constitutions as shown in the following (1) to (7).

(1) A reverse osmosis membrane for wastewater treatment comprising a sulfonated poly(arylene ether sulfone) polymer containing a constituting component represented by the following formula [I], characterized in that, in a proton nuclear magnetic resonance spectrum where water molecules in the membrane are measured using the reverse osmosis membrane in a water-containing state, the relation between the chemical shift A (ppm) of spectral peak top derived from bound water and the chemical shift B (ppm) of spectral peak top derived from bulk water satisfies $(B-0.36) \leq A < (B-0.30)$:

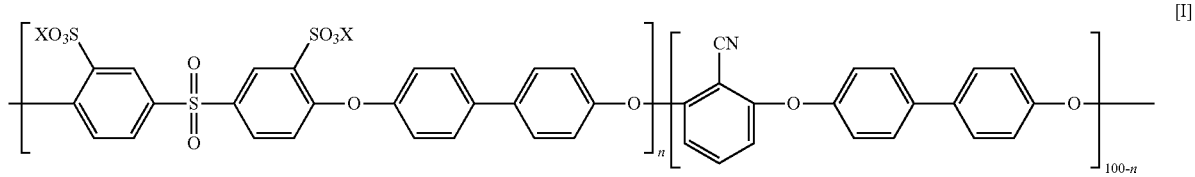

wherein X is H or a univalent cationic species and n is an integer of 10 to 50.

(2) The reverse osmosis membrane according to (1), wherein logarithmic viscosity of the sulfonated poly(arylene ether sulfone) polymer is 1.0 to 2.3 dL/g.

(3) The reverse osmosis membrane according to (1) or (2), wherein content of sulfonic acid group in the sulfonated poly (arylene ether sulfone) polymer is 0.5 to 2.3 meq/g.

(4) The reverse osmosis membrane according to any of (1) to (3), wherein no crystallization peak is observed in the observation by differential scanning calorimetry.

(5) The reverse osmosis membrane according to any of (1) to (4), wherein the reverse osmosis membrane is a hollow fiber membrane having inner diameter of 70 to 100 μm and outer diameter of 140 to 175 μm.

(6) The reverse osmosis membrane according to (5), wherein no pore having diameter of not less than 10 nm is observed in a wall thickness within 1 μm from the outer surface of the hollow fiber membrane.

(7) The reverse osmosis membrane according to (5) or (6), wherein the yield strength in a wet state is from 4.5 MPa to less than 9.5 MPa.

Advantages of the Invention

Since the reverse osmosis membrane of the present invention uses a specific sulfonated poly(arylene ether sulfone) polymer as a material, it has a high resistance to chemicals and has a strong resistance to both solutions of alkali-type chemicals and of chlorine-type chemicals used for washing the membrane. In addition, since position of the peak top derived from bound water upon containing the water is controlled within the range of the specific chemical shift values in the reverse osmosis membrane of the present invention, sulfonic acid group in the membrane and water molecules undergo an interaction in a favorable manner and, as a result, both salt rejection rate and water permeability required for wastewater treatment can be achieved in a high level.

BRIEF DESCRIPTION OF THE DRAWINGS

FIG. 1 shows an example of a proton NMR spectral chart.

BEST MODE FOR CARRYING OUT THE INVENTION

Until now, cellulose triacetate (CTA) or cross-linked aromatic polyamide (PAm) has been used as a material for a reverse osmosis membrane. Although CTA membrane is excellent in terms of the resistance to chlorine, it has a problem of being inferior in terms of the resistance to alkali. On the other hand, PAm is excellent in terms of the resistance to alkali as compared with CTA, it is inferior in terms of the resistance to chlorine. A reverse osmosis membrane has a problem during its use that sedimentation of organic and inorganic substances is resulted on the membrane surface (fouling) and its water permeability is deteriorated. Generally, as a means for removing the fouling, there is a method where the membrane is dipped in a liquid containing acid, alkali or chlorine. However, CTA is not strong in its resistance to alkali and PAm is not strong in its resistance to chlorine. Thus, there has been a demand for an invention of membrane being excellent in its resistance to chemicals in view of its use for a long period of time.

Since materials of polysulfone type and polyethersulfone type are hydrophobic in general, they have a characteristic that their molecular cohesion is poor. Therefore, even if membrane is formed by utilizing a non-solvent induced phase separation (NIPS) method or a thermally induced phase separation (TIPS) method, pores being larger than ultrafiltration membrane (UF, pore size: several tens to several hundreds nm) are produced. Accordingly, there is resulted a problem that the resulted membrane cannot achieve the function as a reverse osmosis membrane. Under such circumstances, the present inventors have hit upon an idea that a group having an interaction force is covalently bound for enhancing the intermolecular force. To be more specific, a group having negative charge is preferred as a group which is to be covalently bound. Examples thereof include carboxyl group, phosphoric acid group and sulfonic acid group and, according to the study of the present inventors, sulfonic acid group has been found to show a particularly high effect.

It is further necessary that two requirements being contrary to each other—permeation of salt is to be excluded while water permeability is to be secured—should be satisfied. What is important at this time is the amount and the alignment of sulfonic acid group. When water molecules permeate through the membrane, they are successively permeated being induced by chemical receptivity of the sulfonic acid group. At that time, distance between the sulfonic acid group and the water molecule is important. Thus, when water molecule cannot easily come closer to sulfonic acid group even in case the density of the sulfonic acid group is high, the sulfonic acid group cannot achieve its receptivity and, as a result, permeation of water does not reach the aimed level and filtration rate becomes small. Thus, the problem is left unsolved by mere increase of the rate of numbers of sulfonic acid group in a molecule. It is necessary to optimize the density and the distribution of sulfonic acid group in the membrane structure as a whole.

For such a problem, the present inventors have found a method where the distribution of the sulfonic acid group can be controlled by means of adjusting the coagulating condition of the membrane. It has been further found that degree of the receptivity of the sulfonic acid group can be measured using nuclear magnetic resonance spectrum (NMR). Generally, when water molecule carries out an interaction with another chemical species in the measurement of the proton NMR, there is a change in the density of electrons existing around the proton in water molecule. Degree of such a change can be measured by means of chemical shift.

The reverse osmosis membrane of the present invention has been completed on the basis of the above findings. The biggest characteristic thereof is that sulfonated poly(arylene ether sulfone) polymer having high resistances to alkali and to chlorine as compared with CTA and PAm is selected as a material and that, for a purpose that the sulfonic acid group of this polymer can well carry out an interaction with water molecule when water is contained therein, the relation between the chemical shift A (ppm) of spectral peak top derived from bound water and the chemical shift B (ppm) of spectral peak top derived from bulk water is controlled to satisfy the relation of $(B-0.36) \leq A < (B-0.30)$ when water molecule in the water-containing membrane is measured by means of proton NMR. There has been no such a thing in which a material polymer of reverse osmosis membrane is designed in such a point of view whereby both salt rejection rate and water permeability can be achieved while keeping resistance to chemicals.

The reverse osmosis membrane of the present invention is a reverse osmosis membrane for a purpose of wastewater treatment and is used for a method where pressure of not lower than osmotic pressure is applied to wastewater (industrial wastewater, or treated water for preparing pure water, ultrapure water or purified water) to prepare fresh water. Pressure for the wastewater treatment is usually 0.5 MPa to 2.0 MPa, which can be set to a level lower than that used for desalination of seawater or saline water. As to the salt rejection rate and the water permeability of the reverse osmosis membrane required for wastewater treatment, it is usually preferred that the salt rejection rate is not less than 93% and the filtration rate is not less than 180 L/m$^2$/day.

As to the reverse osmosis membrane of the present invention, a hollow fiber membrane or a flat membrane is used. Hollow fiber membrane generally comprises hollow fiber prepared by discharging a polymer from a nozzle of tube-in-orifice type or from a nozzle of arc type (three-point bridge) and coagulating the discharged polymer. Further, hollow fiber membrane is generally in a form of an asymmetric membrane comprising a single material. Still further, since hollow fiber membrane can have more effective membrane area per unit volume in a pressure container (module) than flat membrane, there is an advantage that it is possible to make the module compact. However, when the inner part of the hollow fiber membrane is clogged, its recovery is difficult. Due to this, the hollow fiber membrane is often used as an outside-in type. On the other hand, flat membrane is usually a film-shaped membrane and generally has such a structure where a layered membrane comprising polyester taffeta, polysulfone, etc. are used as a support layer and polyamide, sulfonated polysulfone, etc. are layered thereon as a separation-functioning layer. As to the module, that of a spiral type is mostly used. As to the reverse osmosis membrane of the present invention, it is preferred to use a hollow fiber membrane which has big membrane area per volume of the module and which is hardly contaminated with foreign matters in a permeating side. The hollow fiber membrane is designed in such a manner that the predetermined salt rejection rate and permeability depending upon the use are achieved and further that the changes of the membrane with elapse of time are small.

The reverse osmosis membrane of the present invention comprises a sulfonated poly(arylene ether sulfone) polymer containing a constituting component represented by the following formula [I]:

lowly polymerized 3,3'-disulfo-4,4'-dichlorodiphenylsulfone derivative. The sulfonated poly(arylene ether sulfone) polymer is particularly excellent in its resistance to chemicals (resistance to alkali and to chlorine) and has little change with elapse of time upon a long-term use of the membrane.

Sulfonated poly(arylene ether sulfone) polymer may be produced by conventionally known methods and, for example, it may be produced by polymerization according to an aromatic nucleophilic substitution reaction using the left hand side and the right hand side compounds of the above formula [I] as monomers. When polymerization is conducted according to the aromatic nucleophilic substitution reaction, an activated difluoro aromatic compound and/or an activated dichloro aromatic compound containing the left hand side and the right hand side compounds of the above formula [I] may be made to react with an aromatic diol in the presence of a basic compound. The polymerization may be conducted at the temperature range of 0 to 350° C. and the temperature of 50 to 250° C. is preferred. When the temperature is lower than 0° C., there is a tendency that the reaction does not carry on sufficiently while, when it is higher than 350° C., there is a tendency that decomposition of the polymer may also start. Although the reaction may be conducted without solvent, it is preferred to be conducted in a solvent. Examples of the usable solvent include N-methyl-2-pyrrolidone, N,N-dimethylacetamide, N,N-dimethylformamide, dimethyl sulfoxide, diphenylsulfone and sulfolane although they are non-limitative but anything which can be used as a stable solvent in an aromatic nucleophilic substitution reaction may be used. Each of those organic solvents may be used solely or a mixture of two or more thereof may be used. Examples of the basic compound include sodium hydroxide, potassium hydroxide, sodium carbonate, potassium carbonate, sodium hydrogen carbonate and potassium hydrogen carbonate although they are non-limitative but anything which can make an aromatic diol into an active phenoxide structure may be used. In an aromatic nucleophilic substitution reaction, water is sometimes produced as a side product. In that case, it is also possible to discard the water outside the system as an azeotropic mixture by such a means that toluene or the like is made

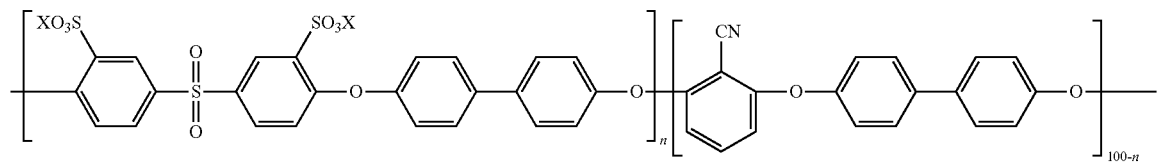

wherein X is H or a univalent cationic species and n is an integer of 10 to 50. There is no particular limitation for the univalent cationic species and examples thereof include sodium, potassium, lithium and other metal species as well as various kinds of amines.

The sulfonated poly(arylene ether sulfone) polymer used in the present invention is a polymer prepared by synthesizing poly(arylene ether) using a monomer (3,3'-disulfo-4,4'-dichlorodiphenylsulfone derivative) into which sulfonic acid group is introduced onto an electron-attractive aromatic ring. In this polymer, sulfonic acid group is hardly eliminated therefrom even at high temperature. This polymer has such a characteristic that, as a result of the use of 2,6-dichlorobenzonitrile together with a 3,3'-disulfo-4,4'-dichlorodiphenylsulfone derivative, a highly polymerized poly(arylene ether) compound is produced within short time even by the use of a to coexist in the reaction system in addition to a polymerization solvent. As a method for discarding the water outside the system, a water absorbent such as molecular sieve may be used as well. When the aromatic nucleophilic substitution reaction is conducted in a solvent, it is preferred that a monomer is charged thereinto so as to make the concentration of the resulting polymer 5 to 50% by weight. When it is less than 5% by weight, degree of polymerization tends to hardly rise. On the other hand, when it is more than 50% by weight, there is a tendency that viscosity of the reaction system becomes too high and after-treatment of the reaction product becomes difficult. After completion of the reaction, the solvent is removed by evaporation from reaction solution and the residue is washed if necessary whereby a desired polymer is obtained. It is also possible that the reaction solution is added to a solvent to which solubility of the polymer is low so that the polymer is precipitated as a solid and the polymer is obtained by filtering the precipitate.

Logarithmic viscosity of the sulfonated poly(arylene ether sulfone) polymer is preferred to be 1.0 to 2.3 dL/g. When the logarithmic viscosity is less than 1.0 dL/g, the membrane after making into a reverse osmosis membrane is apt to become fragile while, when it is more than 2.3 dL/g, there is a risk that dissolution of the polymer is difficult resulting in a problem in terms of a molding ability.

Content of sulfonic acid group in the sulfonated poly (arylene ether sulfone) polymer is preferred to be 0.5 to 2.3 meq/g. When the sulfonic acid group content is less than 0.5 meq/g, there is a risk that no sufficient salt rejection rate and water permeability as a reverse osmosis membrane are achieved while, when it is more than 2.3 meq/g, there is a risk that the reverse osmosis membrane is swollen at high temperature under high humidity and is not suitable for practical use.

The reverse osmosis membrane using the above polymer material of the present invention is characterized in that, in a proton nuclear magnetic resonance (NMR) spectrum where water molecules in the membrane are measured using the reverse osmosis membrane in a water-containing state, the relation between chemical shift A (ppm) of the spectral peak top derived from bound water and chemical shift B (ppm) of the spectral peak top derived from bulk water is controlled to satisfy $(B-0.36) \leq A < (B-0.30)$. Here, bound water is a water molecule forming a solvation by an interaction with a charged group or a polar group in fine pores of the reverse osmosis membrane and its rotation and translation movements are restricted. On the other hand, bulk water (also called "free water") keeps its usual liquid state and is in a state of high motility conducting the rotation/translation movements. With regard to chemical shift, when outer energy (radio wave) is applied to an object to be measured existing in magnetic field of proton NMR, the outer energy amount to be absorbed varies depending upon the quantity of the density of the electron existing around the hydrogen atoms of the object to be measured and the difference thereof is expressed as the difference (chemical shift difference) of the appearing place of the NMR spectral peak. When the electron density is large, the shielding effect to the outer energy is high and a spectral peak appears in the high magnetic field side (the side where the ppm value is small). When the electron density is small, the shielding effect is small and a spectral peak appears in the low magnetic field side (the side where the ppm value is large). Accordingly, large or small of the electron density stands for large or small of the chemical interaction acting on the chemical shift of proton NMR of water molecule in the membrane. A reverse osmosis membrane comprising the polymer represented by the formula [I] has a sulfonic acid group and it is likely that bound water particularly strongly conducts the interaction with this group. Electron density of sulfonic acid group is larger than that of bulk water and it is likely that the electron density near the bound water forming a strong interaction becomes slightly larger than that of bulk water. Accordingly, chemical shift of bound water appears at the side which is nearer the high magnetic field than the bulk water. The method for measuring the proton NMR of water molecule existing in the membrane is as follows. A hollow fiber membrane sample which was previously dipped in distilled water for 10 minutes at room temperature (25° C.) was cut into the length of about 5 cm and four of said samples were inserted into a capillary tube of 3 mm diameter. Water content of the sample at that time was made about 300 to 400% by weight. Said capillary tube was inserted into an NMR tube of 5 mm diameter and subjected to a proton NMR measurement using AVANCE 500 manufactured by BRUKER (resonance frequencies: 500.13 MHz; temperature: 30° C.; FT integration: 16 times; waiting time: 21 seconds). (Shimming was conducted in advance with using heavy water ($D_2O$).)

FIG. 1 shows an example of a proton NMR spectral chart. In the two spectral peaks observed at that time, the spectral peak appearing in the low magnetic field side is adopted as that derived from bulk water and the peak top of this chemical shift is adjusted to 5.24 ppm to be used as a standard. Then the chemical shift of the peak top of the spectral peak derived from bound water appearing at the high magnetic field side and the distance thereof are confirmed. Incidentally, the peak top means the highest position of the spectral peaks obtained as the result of the NMR measurement.

When the peak top A (ppm) of the chemical shift derived from bound water and the peak top B (ppm) of the chemical shift derived from bulk water are in a relation of $A < (B-0.36)$, there is a problem that, although the membrane structure is significantly dense as a whole and the salt rejection rate is not less than about 93%, the water permeability significantly lowers and that is not practical. Similarly, in the case of $B > A \geq (B-0.30)$, the salt rejection rate is lower than 90% and that is not favorable.

Now the chemical interaction between the water molecule in the reverse osmosis membrane of the present invention and a polymer chain constituting the membrane molecule and its relation to the membrane property will be mentioned. Generally, the membrane which is under use as an as-spun and as a reverse osmosis membrane has moisture of about 50% to 1,000% of water content in the membrane. When the water-containing state of such a range is maintained, the chemical shift between spectral peak tops in proton NMR of bulk water and bound water shows nearly a constant value regardless of the water content. At that time, not all of the water molecules in said reverse osmosis membrane conduct a chemical interaction with the polymer chain constituting the membrane. According to the investigation of the present inventors, the fact whether or not the interaction exists can be judged by measuring the proton NMR of water molecule and, when the membrane is almost in the above water content, it has been found that, regardless of the quantity of the water content, spectral peak appears at the position which is at stable and definite distance from the spectral peak top of bulk water. To be more specific, it has been found that one to plural peak(s) is/are observed within such a range where the chemical shift A (ppm) of spectral peak top derived from bound water and the chemical shift B (ppm) of spectral peak top derived from bulk water satisfies the relation of $(B-0.36) \leq A < (B-0.30)$. This means that the states the water taking in the membrane have plurality. Due to the above, it has been found that the water in the membrane comprises some water which was subjected to certain chemical interaction (bound water) in addition to free water.

According to the investigation of the present inventors, it has been found that there is a strong correlation between the concentration of a polymer solution to be subjected to spinning and the above-mentioned chemical shift and physical values. Thus, when the above polymer was used as a material for the reverse osmosis membrane and proton NMR of water molecules in the membrane was measured using a hollow fiber membrane (in a water-containing state) prepared in such a condition that the polymer concentration was lower than 25% by weight, the chemical shift of water molecule in the membrane appeared within a range of $B \geq A \geq (B-0.14)$ (ppm). Further, the membrane prepared under such a condition has a possibility that no salt rejection rate is shown or the salt rejection rate is not more than 5% when evaluation is done in terms of NaCl. Further, there are many cases where strength of the hollow fiber membrane becomes low and problems in terms of resistance to pressure are resulted whereby no function is achieved as a reverse osmosis membrane in a practical level. On the contrary, when the polymer concentration is made not lower than 35% by weight, physical property of the resulting membrane is within such an extent that its salt rejection rate keeps 93% or even more. The chemical shifts of spectral peak top of the water molecule measured in a similar manner are in a relation of $A<(B-0.36)$ (ppm) whereby the water permeability is lower than 180 $L/m^2/day$ and that is not favorable.

Moreover, the air gap length upon spinning also greatly affects on the alignment of sulfonic acid group in the membrane and further on the changes in the chemical shift received by bound water. According to the investigation of the present inventors, it has been found that there is a strong correlation between the air gap length and the above-mentioned chemical shift and membrane properties. Thus, when a fiber was prepared under such a condition where air gap length is longer than a certain critical value and where the solvent in the system is positively evaporated using a heating zone and proton NMR of the prepared fiber was measured, the chemical sifts of water molecules in the membrane appeared within a range of $B \geq A \geq (B-0.14)$ (ppm). In the hollow fiber membrane prepared under such a condition, the solvent in the membrane is excessively evaporated during the process of passing through the air gap. When the solvent in the system is evaporated, it results in the increase of a polymer concentration and, at the same time, aggregation of sulfonic acid group is accelerated. As a result, the sulfonic acid group in the resulting system is localized. When the membrane having such a structure is utilized as a reverse osmosis membrane, water molecule diffusing in the membrane cannot effectively conduct an interaction with the sulfonic acid group. As a result, it causes reduction of salt rejection rate and reduction of filtration rate. In addition, polymer density in the membrane surface side becomes very high and the structure becomes very dense. As a result, a skin layer is formed on the outermost layer of the membrane and a coarse structure having no separating ability is formed inside. Water permeability of such a membrane does not reach 10 $L/m^2/day$ and salt rejection rate is less than 50% whereby no function is achieved as a reverse osmosis membrane in a practical level.

Although the detailed mechanism thereof has been still ambiguous, the present inventors have found that there is a correlation between the polymer concentration and the membrane properties. Thus, when the polymer concentration is too low, aggregation of sulfonic acid group excessively proceeds upon formation of a membrane as the characteristic of the membrane structure. It means that the water molecule existing in the membrane cannot efficiently achieve the interaction state with the sulfonic acid group in said aggregated structure. As a result, when it is used as a reverse osmosis membrane, the water molecule diffusing in the membrane does not efficiently conduct an interaction with sulfonic acid group whereby diffusion of the water molecule is suppressed and low water permeability is resulted. The chemical shift received by bound water is also in a position near that of bulk water. On the contrary, when the polymer concentration is made high, the size of the structure of aggregation may be small. However, sulfonic acid group will be diffused uniformly without aggregation, whereby the possibility of chemical contact and interaction with the water molecule in the membrane increases. As a result, sulfonic acid group channel is aligned and formed so as to make the diffusion of water molecule quick whereby the high water permeability is achieved. The chemical shift of bound water is also observed at the position being far from that of the bulk water. Based on such findings, the reverse osmosis membrane of the present invention is made, with regard to peak top positions of proton NMR derived from bulk water in the membrane of a water-containing state, in such a manner that chemical shift A (ppm) of spectral peak top derived from bound water and chemical shift B (ppm) of spectral peak top derived from bulk water satisfy the relation of $(B-0.36) \leq A < (B-0.30)$ so that the membrane has the water permeability and the salt rejection rate required for wastewater treatment.

Now the method for the manufacture of the reverse osmosis membrane of the present invention will be illustrated taking the case of a hollow fiber membrane as an example. The same as in the conventionally known methods, the hollow fiber membrane of the present invention may be manufactured in such a manner that dope is discharged into a coagulating bath from a spinneret via air gap and the resulting hollow fiber membrane is washed with water and subjected to a treatment with hot water so as to shrink the membrane.

As a dope, there is used a dope containing the polymer represented by the formula [I] which is a membrane material, the solvent and the non-solvent. Organic acid and/or organic amine are/is added thereto upon necessity. As to the solvent, it is preferred to use one or more member(s) selected from N,N-dimethylformamide, N,N-dimethylacetamide, N-methyl-2-pyrrolidone and N,N-dimethylsulfoxide. More preferred one is N-methyl-2-pyrrolidone. As to the non-solvent, it is preferred to use one or more member(s) selected from ethylene glycol, diethylene glycol, triethylene glycol and polyethylene glycol. More preferred one is ethylene glycol. As to the organic acid, it is preferred to use amino acid, aromatic carboxylic acid, hydroxylic acid, alkoxylic acid, dibasic acid or hydroxy monoester thereof. More preferred ones are phthalic acid, tartaric acid, ε-amino-n-caproic acid, benzoic acid, 4-methylaminobutyric acid, p-oxybenzoic acid and maleic acid and two or more of them may be mixed and used. As to the organic amine, any of primary, secondary and tertiary hydroxylalkylamines may be used. To be more specific, preferred ones are monoethanolamine, triethanolamine, diisopropanolamine and triisopropanolamine.

Concentration of the polymer of the formula [I] in the dope is preferred to be 32.5 to 35% by weight. When the polymer concentration is lower than the above range, the resulting hollow fiber membrane does not satisfy the salt rejection property demanded for wastewater treatment while, when it is higher than that, there is a possibility that the resulting hollow fiber membrane does not satisfy the practical water permeability. In addition, the ratio by weight of solvent/non-solvent in the dope is preferred to be from 95/5 to 70/30, and more preferred to be from 90/10 to 75/25. When the ratio by weight of solvent/non-solvent is lower than the above range, the membrane surface structure does not become dense since evaporation of the solvent does not proceed and, although water permeability does not greatly change, salt rejection rate becomes low. When it is higher than the above range, formation of extremely asymmetric membrane proceeds whereby there is a possibility that strength of the membrane is not achieved.

Then the dope prepared as above is dissolved by heating at 90 to 190° C. and the dissolved dope is extruded from a nozzle of an arc (three-point bridge) type, a C type or a tube-in-orifice type heated at 150 to 180° C. When a tube-in-orifice type nozzle is used, it is preferred to use air, nitrogen, carbon dioxide, argon, etc. as a hollow-forming material although it is also possible to use an organic solvent having higher boiling point than the spinning temperature. The extruded dope is passed through the air gap (gaseous atmosphere) for 0.02 to 0.4 second and then dipped in an aqueous coagulating bath to coagulate.

As mentioned already, it is necessary for a good interaction of the sulfonic acid group in the material polymer with the water molecule that the sulfonic acid group is uniformly distributed in the membrane. For such a purpose, setting of the air gap length is also important. Here, the term "air gap" means a space existing between a spinning nozzle and a coagulating bath in a dry-wet spinning. When the length of the air gap is as long as longer than 50 cm, the solvent is evaporated while the extruded dope runs in the air gap and, aggregation of sulfonic acid group takes place in the membrane and that is not preferred. When such a membrane is used, salt rejection rate becomes less than 50% and water permeability becomes not more than 10 $L/m^2/day$ and that is not practical. On the other hand, when the air gap is as short as less than 0.5 cm, the unstable state of the dope after being extruded from a nozzle is fixed by the coagulation and that is not preferred. When such a membrane is used, although filtration rate increases, the salt rejection rate lowers and that is not practical. When the air gap is made nil and a membrane is prepared by dipping a nozzle in a coagulating bath, strength becomes insufficient and that is not preferred. Preferred air gap length is 30 cm to 1 cm, and more preferably 20 cm to 2 cm.

As to a composition of solvent and non-solvent of a coagulating bath, it is preferred to use the same composition as that used for the dope. As to the composition ratio of a coagulating bath, the ratio by weight of solvent:non-solvent:water is preferred to be 0 to 15:0 to 8:100 to 77. When the rate of water is too low, phase separation of the membrane proceeds and pore size may become too large.

From the hollow fiber membrane drawn from the coagulating bath, the remaining solvent, non-solvent, etc. are removed by washing with water or salt water. Examples of the method for washing with water include a multistage inclination gutter method for washing with water where water for washing is flown down in a long inclined gutter and a hollow fiber membrane is dipped in said washing water to conduct the washing with water; a Nelson roller method for washing with water where two long rollers (Nelson rollers) crossing with each other in certain angles are used and hollow fiber membranes are wound in fold upon fold on the rollers wherein the Nelson roller surfaces are always made wet with water for washing and the washing with water is conducted by means of contacting said water for washing to the hollow fiber membranes; a net shower washing method with water where hollow fiber membrane is shaken down onto a net followed by washing with shower water; and a washing with water by dipping where hollow fiber membrane is directly dipped into a washing water in a deep vessel followed by washing with water.

It is preferred that the hollow fiber membrane subjected to a washing treatment with water is dipped into water under a non-tensed state and is subjected to a treatment with hot water or hot salt water (annealing treatment) at 90 to 120° C. for 5 to 60 minutes. Under the temperature condition of higher than 100° C., an autoclave or the like may be used. As a result of subjecting to a treatment with hot water, improvements in fixation and dimensional stability of membrane structure and in thermal stability can be expected. For such a purpose, in the annealing treatment, the temperature which is higher than a glass transition point and is lower than a melting point is usually adopted. Although the membrane structure or, particularly, alignment of sulfonic acid group is almost decided by dope concentration and air gap length, it is not always aligned at the most stable position. The annealing treatment has such an effect that the position of molecular chain constituting the membrane including the alignment of the sulfonic acid group in the membrane is brought to the optimum place.

When the temperature for the treatment with hot water is higher than the above range, densification of the membrane structure proceeds too much whereby the balance between the salt rejection rate and the water permeability may be lost while, when it is lower than the above range, asymmetry of the membrane structure is not sufficient whereby no desired salt rejection rate may be achieved. Time for the hot water treatment is usually 5 to 60 minutes. When the treating time is too short, no sufficient annealing effect may be achieved. In addition, non-uniformity may be resulted in the membrane structure. When the treating time is too long, not only an increase in manufacturing cost but also too much densification of the membrane may happen whereby no desired balance in the properties may be achieved.

The hollow fiber membrane of the present invention prepared as above is assembled as a hollow fiber membrane module by the conventionally known method. An example of the assembling of the hollow fiber membrane to make a module is that 45 to 180 hollow fiber membranes are put together to give hollow fiber membrane bundles, then they are aligned parallel to make a flat hollow fiber membrane bundle, and further it is wind up with traverse to a core pipe having many pores to wind around thereon. The winding angle at this time is made 5 to 60° and the winding is done in such a manner that a crossing part is formed on the surface of a specific position of the wound-up body. After that, both ends of this wound-up body are adhered and only one side and/or both sides thereof is/are cut to form a hollow fiber opening(s) whereupon a hollow fiber membrane element is prepared. The resulting hollow fiber membrane element is inserted into a pressure container to assemble a hollow fiber membrane module.

Inner diameter of the hollow fiber membrane is preferred to be 70 to 100 μm. When the inner diameter is smaller than the above range, loss in the pressure of the fluid flowing through the hollow area usually becomes large whereby there is a possibility that no desired volume of permeated water is achieved at a pressure used in wastewater treatment when length of the hollow fiber membrane is made relatively long. On the other hand, when the inner diameter is larger than the above range, a scramble between the hollow rate and the module membrane area happens whereby it is necessary to sacrifice any of the pressure resisting property and the membrane area per unit volume.

Outer diameter of the hollow fiber membrane is preferred to be 140 to 175 μm. When the outer diameter is smaller than the above range, the inner diameter inevitably becomes small whereby the same problem as in the case of the above inner diameter is resulted. On the other hand, when the outer diameter is larger than the above range, it is not possible to make the membrane area per unit volume in the module large and the compactness which is one of the advantages of the hollow fiber membrane module is deteriorated.

Length of the hollow fiber membrane is preferred to be 20 to 300 cm. This length is the possible range which is generally used in a hollow fiber membrane module. However, if the length is out of the above range, there is a possibility that it is difficult to satisfy both water permeability and salt rejection rate at a low operating cost.

The reverse osmosis membrane of the present invention has such a characteristic that no crystallization peak is measured when observed by differential scanning calorimetry.

This is likely to be due to the fact that, as shown by the formula [I], the polymer chain contains many ether bonds whereby the thermal motility of the main chain is high, and that the polymer chain has a hydrophobic segment having a low molecular cohesion. Accordingly no aggregating structure resulting in crystallization is expressed. In addition, when the reverse osmosis membrane of the present invention is a hollow fiber membrane, there is a characteristic that no pore having diameter of not less than 10 nm is observed in a wall thickness within 1 μm from the outer surface of the hollow fiber membrane. Generally, in a hollow fiber-like solution being dipped in a coagulating liquid via air gaps, removal of solvent takes place from the outermost layer of the hollow fiber membrane whereby phase separation immediately takes place. However, since phase separation time is short in the outermost side, fine structure is formed and the nearer the inside (thickness direction), the longer the phase separation time whereby there is a tendency that coarser structure is formed in the inside than in the surface side. Particularly, the polymer represented by the formula [I] has a sulfonic acid group and an interaction takes place within the sulfonic acid groups or via water molecules. Accordingly, the action proceeds in such a direction that the structure of the outermost side of the hollow fiber membrane becomes dense and, as a result, pore size on the membrane surface side becomes significantly small.

In the reverse osmosis membrane of the present invention, the yield strength in the wet state is from 4.5 MPa to less than 9.5 MPa. Generally, it is necessary to apply the outer pressure of not lower than osmotic pressure of wastewater (for example, it is about 0.04 MPa when concentration of NaCl is 500 ppm) for wastewater treatment. For achieving the practical filtration rate, it is necessary to apply the outer pressure of 0.5 to 2.0 MPa. As a result of investigations of the present inventors, it has been found that there is a correlation between the resistance of the hollow fiber membrane to pressure and the yield strength in the tensile direction of the hollow fiber membrane in a wet state. Generally, the above yield strength is preferred to be not less than 4.7 MPa, and more preferred to be not less than 5 MPa for using the hollow fiber membrane as a reverse osmosis membrane for wastewater treatment. When a hollow fiber membrane does not satisfy the above range of yield strength, there is a possibility that it cannot resist for the operation outer pressure for wastewater treatment. When the above yield strength is less than 4.5 MPa in the hollow fiber membrane comprising the polymer of the formula [I], the fiber-like shape is slightly deformed in the practical range of the outer pressure used in the wastewater treatment whereby there is a possibility that the water permeability tends to become bad and that is not preferred. For endowing the membrane with the pressure resistance of not lower than 9.5 MPa, it is necessary to enhance the polymer concentration in the dope but, within such a range, there is a possibility that water permeability of the hollow fiber membrane lowers and that is not preferred. As a result of the intensive investigations of the present inventors, it has now been found that, for a purpose of using the polymer of the formula [I] and applying as a reserve osmosis membrane for wastewater treatment together with expressing the practical salt rejection rate and water permeability, the yield strength in a wet state is preferred to be from 4.5 MPa to less than 9.5 MPa.

In addition, it is desirable that the membrane still maintains its yield strength even after being exposed to the solution of chemicals. When the membrane is actually used, it is necessary to periodically wash with a solution of chemicals in order to maintain the membrane properties. At that time, even after the membrane is exposed to the solution of chemicals, it is preferred that the lowering of pressure-resisting property and salt rejection rate is as small as possible. Since the reverse osmosis membrane of the present invention is expected to be used for wastewater treatment, it is preferred that lowering of the salt rejection rate of the membrane is rarely observed and that the strength retaining rate of the membrane is not less than 80%, preferably not less than 90% and more preferably not less than 95%. When the strength retaining rate is less than the above, there is a possibility that the hollow fiber membrane is no longer resisting to the operating outer pressure for the wastewater treatment, that the appearance of fiber-like shape is deformed and that the water permeability and the salt rejection rate become bad. The present inventors investigated the resistance to chlorine and to alkali using the hollow fiber membrane comprising the polymer of the formula [I]. As a result, it has been found that there is almost no change in the salt rejection rate even after 12 weeks and the yield strength retaining rate is not less than 98% in both of the case where the membrane is dipped in a chlorine solution adjusted to 100 ppm of free chlorine concentration, pH 7 and about 20° C. and the case where the membrane is dipped in an alkali solution adjusted to pH 10 and 70° C. Incidentally, the yield strength retaining rate is as follows:

yield strength retaining rate(%)=(yield strength of the hollow fiber membrane after dipping[MPa]/yield strength of the hollow fiber membrane before dipping[MPa])×100

EXAMPLES

As hereunder, the present invention will be more specifically illustrated by way of Examples although the present invention is not limited to those Examples only. Measurements of the characteristic values measured in the Examples were conducted according to the following methods.

(1) Logarithmic Viscosity

Polymer powder was dissolved in N-methyl-2-pyrrolidone so as to make its concentration 0.5 g/dl, its viscosity was measured using an Ubbelohde viscometer in a constant-temperature vessel of 30° C. and evaluation was conducted in terms of logarithmic viscosity (ln [ta/tb]/c), wherein ta is the time in second(s) needed for falling a sample solution; tb is the time in second(s) for falling a solvent only; and c is concentration of the polymer.

(2) Content of Sulfonic Acid Group

Weight of the sample after being dried for one night in a nitrogen atmosphere was measured, a stirring treatment with aqueous solution of sodium hydroxide was conducted and, after that, back titration was conducted using aqueous solution of hydrochloric acid to determine the ion exchange capacity (IEC).

(3) n in the Formula [I]

The polymer (20 mg) being previously dried for one night in a vacuum drier adjusted at 100° C. was dissolved in 1 mL of deuterated DMSO (DMSO d6) from Nacalai Tesque and the resulting polymer solution was used to measure proton NMR by BRUKER AVANCE 500 (resonance frequencies: 500.13 MHz; temperature: 30° C.; FT integration: 32 times). In the resulting spectral chart, the spectral peaks corresponding to protons a and b on aromatic ring of the formula [I] as shown below were independent and the ratio of their integral strengths was as shown by the following formula:

integral strength $a$:integral strength $b=n$:(100−$n$)

Protons a and b on the aromatic ring for the evaluation of n are shown in the following formula [I]:

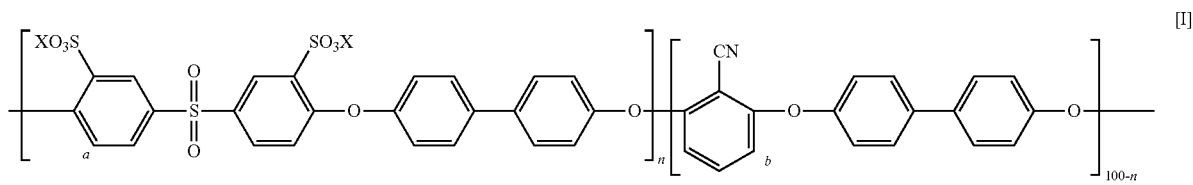

(4) Water Content

About 1 g of the hollow fiber membrane in a wet state was weighed using an electric balance and previously subjected to vacuum drying for one night using a vacuum drier adjusted at 100° C. The hollow fiber membrane after drying was weighed by an electric balance and water content was calculated according to the following formula:

water content(%)=(weight of hollow fiber membrane after drying[wt %]/weight of hollow fiber membrane before drying[wt %])×100

(5) Chemical Shift

A hollow fiber membrane sample which was previously dipped in distilled water for 10 minutes at room temperature (25° C.) was cut into the length of about 5 cm and four of said samples were inserted into a glass capillary tube of 3 mm diameter. Water content of the sample at that time was made about 300 to 400% by weight. Said capillary tube was inserted into an NMR tube of 5 mm diameter and subjected to a proton NMR measurement using AVANCE 500 manufactured by BRUKER (resonance frequencies: 500.13 MHz; temperature: 30° C.; FT integration: 16 times; waiting time: 21 seconds). (Shimming was conducted in advance with using heavy water ($D_2O$).)

FIG. 1 shows an example of proton NMR spectral chart. In the observed two spectral peaks, the spectral peak appearing in the low magnetic field side was adopted as that derived from bulk water and the peak top of this chemical shift was adjusted to 5.24 ppm to be used as a standard. Chemical shift of peak top of the spectral peak derived from bound water appearing in the high magnetic field side and the distance thereof were confirmed. Incidentally, as to the all readings of the chemical shift values, the peak top values of spectral peak were read.

(6) Pore Observation

A hollow fiber membrane was dipped in liquid nitrogen to freeze and the cross section of the hollow fiber membrane and the surface of the hollow fiber membrane were fixed onto a sample holder for an SEM observation using a double-sided adhesive tape. Those samples were subjected to a platinum in advance coating and observed under a scanning electron microscope (S-800) manufactured by Hitachi of 10,000 magnifications. At that time, in the wall thickness within 1 μm from the outer surface of the hollow fiber membrane, it was confirmed whether the pores having diameter of not less than 10 nm were present or absent.

(7) Crystallization Peak

A hollow fiber membrane sample which was dried in advance in a vacuum drier of 60° C. was used and, under nitrogen atmosphere, temperature was raised at a rising rate of 5° C./minute under such a modulated temperature condition that one cycle was 60 seconds, that amplitude was ±0.796° C. and that the temperature range was from 20° C. to 250° C. using a differential scanning calorimetric analyzer (DSC Q100) manufactured by TA Instruments. From the non-reverse heat flow obtained as a result of the measurement, it was confirmed whether the exothermic peak caused by crystallization was present or absent.

(8) Outer and Inner Diameters of the Hollow Fiber Membrane

Using an SUS small plate having a thickness of 2 mm on which pores of 3 mm diameter were formed, an appropriate amount of wet hollow fiber membrane was filled in the pores followed by cutting on the plate to make a sample holder in which the cross section of the hollow fiber membrane was exposed. This was set on a stage of a microscope (ECLIPSE LV100) manufactured by Nikon and then a CCD camera (DS-Ri1) and an image processing device (DIGITAL SIGHT DS-U2) manufactured by Nikon were started up. NIS Element D3.00 SP6 was used as an image analyzing software and outer and inner diameters of the cross section of the hollow fiber membrane appearing on the display were measured using a measuring function of said analyzing software whereby outer and inner diameters of the hollow fiber membrane were calculated.

(9) Yield Strength

A tensile test of the hollow fiber membrane in a wet state was carried out using SHIMADZU AGS-J 1 kN manufactured by Shimadzu. Load cell was made 50N and, for fixing and pulling of the fiber, a flat chuck was used. Setting was conducted where the initial length of the specimen between grips of the chuck was made 50 mm and the load to the fiber upon applying the fiber to the flat chuck was made 0.03N. The crosshead speed of stretching the fiber was made at 50 mm/minute. Stress (MPa), elongation (%) and yield strength (MPa) were calculated from the measured data using the analyzing software (TRAPEZIUM X ver.1.0.2.SP).

(10) Yield Strength Retaining Rate (Resistance to Alkali and to Chlorine)

Sodium hypochlorite solution of Nacalai Tesque was diluted with distilled water to make the free chlorine concentration 100 ppm and then adjusted to pH 7 using 1N hydrochloric acid of the same company to prepare a chlorine solution. Further, 1N aqueous solution of sodium hydroxide of the same company was diluted with distilled water to prepare an alkali solution of pH 10. A bundle of 20 hollow fiber membranes of 20 cm length was dipped thereinto. Temperature of the aqueous chlorine solution was made room temperature (about 20° C.) while temperature of the alkali solution was made 40° C. Dipping was conducted for 12 weeks keeping the free chlorine concentration and pH constant and, after that, yield strength of the dipped fiber was measured by the same method as that for the measurement of the yield strength mentioned above. Formula for calculating the yield strength retention rate is as follows:

yield strength retaining rate(%)=(yield strength of the hollow fiber membrane after dipping[MPa]/yield strength of the hollow fiber membrane before dipping[MPa])×100

(11) Filtration Rate

After the hollow fiber membranes were bundled and inserted into a sleeve made of plastic, thermosetting resin was injected into the sleeve and hardened to seal. The end of the hollow fiber membrane embedded by the thermosetting resin was cut to give an opening of the hollow fiber membrane whereupon there was prepared a module for the evaluation having the membrane area based on the outer diameter of about 0.025 m². This module for the evaluation was connected to a device for testing the membrane properties comprising a tank for supplying water and a pump whereby the properties were evaluated.

A supplying aqueous solution having sodium chloride concentration of 500 mg/L was filtered from outside to inside of the hollow fiber membrane at 25° C. and 1.0 MPa pressure and the device was operated for about 1 hour. After that, water permeated through the membrane was collected from the opening of the hollow fiber membrane and weight of permeable water was measured by an electron balance (LIBROR EB-3200D manufactured by Shimadzu). Weight of the permeable water was converted to volume of the permeable water at 25° C. using the following formula:

volume of the permeable water(L)=weight of the permeable water(kg)/0.99704(kg/L)

Filtration rate (FR) is calculated by the following formula:

FR[L/m/day]=volume of the permeable water(L)/membrane area based on the outer diameter[m=]/collecting time[minutes]×(60[minutes]×24[hours])

(12) Salt Rejection Rate

Sodium chloride concentration was measured using an electric conductivity meter (CM-25R by Toa DKK) from the permeated water collected in the above measurement for filtration rate and the supplying aqueous solution having sodium chloride concentration of 500 mg/L used for the same measurement of filtration rate.

Salt rejection rate is calculated by the following formula:

salt rejection rate[%]=(1−salt concentration of permeated water[mg/L]/salt concentration of supplying aqueous solution[mg/L])×100

Example 1

Sulfonated poly(aryl ether sulfone) type polymer (brevity code: SPN-23) obtained by polymerization of 11.5 mol % of 3,3'-disulfo-4,4'-dichlorodiphenylsulfone disodium salt (brevity code: S-DCDPS), 38.5 mol % of 2,6-dichlorobenzonitrile (brevity code: DCBN) and 50 mol % of 4,4'-biphenol was dried in advance at 110° C. for 12 hours. After that, 71.5 parts by weight thereof was weighed and then 123.2 parts by weight of N-methyl-2-pyrrolidone (brevity code: NMP) and 25.3 parts by weight of ethylene glycol (brevity code: EG) were poured into a separable flask followed by stirring at 170° C. for 3 hours to give a uniform polymer solution having the polymer concentration of 32.5% by weight.

This polymer solution was charged, as a dope, into a spinning device having a plunger-type extruding function. Temperature of the dope was kept at 150° C., and the dope was sent to a tube-in-orifice type nozzle and discharged at the rate of 0.24 g/minute from a dope extruding annular orifice having a slit width of 100 microns (outer diameter: 400 microns; inner diameter: 200 microns). EG was used as an inner liquid, sent at the rate of 0.12 g/minute using a gear pump and extruded from the inner liquid discharging pore of 110 microns. Air gap length was made 20 mm and the resulting fiber was dipped in a coagulating bath comprising salt water of 3.5% by weight concentration. The coagulated hollow fiber membrane was drawn at a spinning rate of 15 m/minute and wound using a skein machine or a winder. The resulting hollow fiber membrane sample was further dipped into salt water of 9.0% by weight concentration and subjected to an annealing treatment under the condition where the temperature was 98° C. and the time was 20 minutes. Details of the membrane and the evaluated result are shown in Table 1.

Example 2

The hollow fiber membrane obtained in Example 1 was dipped into 10% by weight aqueous solution of lithium chloride for one night so that the counter cation (X) on the sulfonic acid group of the formula [I] was changed to lithium ion. Details of the membrane and the evaluated result are shown in Table 1.

Example 3

The hollow fiber membrane obtained in Example 1 was dipped into 10% by weight aqueous solution of potassium chloride for one night so that the counter cation (X) on the sulfonic acid group of the formula [I] was changed to potassium ion. Details of the membrane and the evaluated result are shown in Table 1.

Example 4

The same method as in Example 1 was conducted except that there was used SPN-23 (X=H type) where a counter cation on the sulfonic acid group was converted to proton by dipping the polymer of a sulfonated poly(aryl ether sulfone) type (brevity code: SPN-23) prepared in Example 1 into 2N concentrated sulfuric acid for 24 hours followed by washing the polymer with water until the water after the washing became neutral, that a coagulating bath upon spinning was changed to a salt water of 3.5% by weight concentration, that a step of washing with water immediately after passing through the coagulating bath was conducted and that hot water was used in the annealing treatment after the spinning whereupon a hollow fiber membrane was prepared. Details of the membrane and the evaluated result are shown in Table 1.

Example 5

The same method as in Example 1 was conducted except that n of the formula [I] was made 12 whereupon a hollow fiber membrane was prepared. Details of the membrane and the evaluated result are shown in Table 1.

Example 6

The same method as in Example 1 was conducted except that n of the formula [I] was made 45 whereupon a hollow fiber membrane was prepared. Details of the membrane and the evaluated result are shown in Table 1.

Example 7

The same method as in Example 1 was conducted except that, in a composition of the dope, SPN-23 polymer was made 69 parts by weight, NMP was made 114 parts by weight and EG was made 17 parts by weight whereupon a hollow fiber membrane was prepared. Details of the membrane and the evaluated result are shown in Table 1.

Example 8

The same method as in Example 1 was conducted except that the air gap length was made 10 mm whereupon a hollow fiber membrane was prepared. Details of the membrane and the evaluated result are shown in Table 1.

Example 9

The same method as in Example 1 was conducted except that the air gap length was made 400 mm whereupon a hollow fiber membrane was prepared. Details of the membrane and the evaluated result are shown in Table 1.

Comparative Example 1

Solvent was charged to the polymer prepared in Example 1 so as to make polymer concentration 35% by weight (containing a mixed solvent of NMP and EG in a ratio by weight of 87:13) followed by stirring whereupon homogeneous polymer solution suitable for spinning was prepared. The same method as in Example 1 was conducted using this polymer solution to give a hollow fiber membrane. Details of the membrane and the evaluated result are shown in Table 1.

Comparative Example 2

The same method as in Example 1 was conducted except that the polymer concentration of the dope was made 30% by weight (containing a mixed solvent of NMP and EG in a ratio by weight of 80:20) whereupon a hollow fiber membrane was prepared. Details of the membrane and the evaluated result are shown in Table 1.

Comparative Example 3

The same method as in Example 1 was conducted except that the air gap length was made 3 mm whereupon a hollow fiber membrane was prepared. Details of the membrane and the evaluated result are shown in Table 1.

Comparative Example 4

The same method as in Example 1 was conducted except that the air gap length was made 700 mm and that a tubular heater capable of heating the air in the air gap was installed so that the atmosphere temperature of the air gap was made 100° C. whereupon a hollow fiber membrane was prepared. Details of the membrane and the evaluated result are shown in Table 1.

Comparative Example 5

The same method as in Example 1 was conducted except that polymer of a poly(aryl ether sulfone) type obtained by polymerization of 11.5 mol % of 4,4'-dichlorodiphenylsulfone disodium salt (brevity code: DCDPS), 38.5 mol % of 2,6-dichlorobenzonitrile (brevity code: DCBN) and 50 mol % of 4,4'-biphenol was previously dried in vacuo at 80° C. for 24 hours, 71.5 parts by weight thereof was weighed, then 123.2 parts by weight of N-methyl-2-pyrrolidone (brevity code: NMP) and 25.3 parts by weight of ethylene glycol (brevity code: EG) were poured into a separable flask followed by stirring at 100° C. for 3 hours to prepare a homogeneous polymer solution of 32.5% by weight concentration and that the dope temperature and the spinning temperature of this polymer solution were changed to 60° C. whereupon a hollow fiber membrane was prepared. Details of the membrane and the evaluated result are shown in Table 1.

Comparative Example 6

The same method as in Example 1 was conducted except that the content of the sulfonic acid group in the polymer was decreased (n=8.9 in the formula [I]) whereupon a hollow fiber membrane was prepared. Details of the membrane and the evaluated result are shown in Table 1.

Comparative Example 7

The same method as in Example 1 was conducted except that the content of the sulfonic acid group in the polymer was increased (n=52.3 in the formula [I]) and that 7.0% by weight of salt water was used as a coagulating bath upon spinning whereupon a hollow fiber membrane was prepared. Details of the membrane and the evaluated result are shown in Table 1.

Comparative Example 8

Cellulose triacetate (CTA, Daicel, LT35) (41 parts by weight), 49.9 parts by weight of NMP, 8.8 parts by weight of EG and 0.3 part by weight of benzoic acid were uniformly dissolved at 180° C. to give a dope. The resulting dope was defoamed in vacuo, extruded from an arc-type nozzle at 163° C. into the space which is isolated from the outer air (air gap, AG) and, after AG passing time of 0.03 second, dipped into a coagulating bath of 12° C. comprising NMP:EG:water in 4.25:0.75:95. After that, the hollow fiber membrane was washed by a multistage inclination gutter method and shaken off when the membrane was still in a wet state. The resulting hollow fiber membrane was dipped in water of 60° C. and subjected to an annealing treatment for 40 minutes. Details of the membrane and the evaluated result are shown in Table 1.

Comparative Example 9

Anhydrous piperazine (8.062 parts by weight) and 54.23 parts by weight of 4,4'-diaminodiphenylsulfone were poured, in a nitrogen stream, into a 500-L reactor equipped with nitrogen-introducing pipe, thermometer and stirrer. After that, 50 parts by weight of pyridine as an acid trapping agent and 470 parts by weight of N-methyl-2-pyrrolidone (NMP) as a reaction solvent were added to the reactor followed by well stirring to give a homogeneous solution. After the solution was cooled down to about 5° C., 63.342 parts by weight of terephthalic acid dichloride was poured into the solution and a polycondensation reaction was started. It was stirred for about 30 minutes under cooling and for another about 30 minutes at room temperature. After finishing the reaction, the reaction solution was poured into 1,000 parts by weight of water so that the polymer was precipitated and deposited. After that, fine pulverization of the resulting polymer and washing with pure water for giving a pure product were repeated for four times so that un-reacted substances in the polymer and solvents were removed. Finally, the polymer was dried with hot air of about 80 to 100° C. for about 48 hours.

A dope comprising the above-prepared polyamide (37 parts by weight), N,N-dimethylacetamide (57.11 parts by weight), NMP (5.79 parts by weight), anhydrous polyglycerol (number-average molecular weight=480; 3.7 parts by weight) and calcium chloride hexahydrate (2.75 parts by weight) was discharged from an arc (three-point bridge)-type nozzle (temperature: 130° C.) and introduced into water of about 10° C. to prepare a hollow fiber membrane having the outer diameter of about 165 microns and the hollow rate of about 30%. Further, for a purpose of removal of the solvent and polyglycerol remaining in the membrane, the hollow fiber membrane was dipped into water for one day and night. Details of the membrane and the evaluated result are shown in Table 1.

Details of the membrane in Examples 1 to 9 & Comparative Examples 1 to 9 and the evaluated result are shown in Table 1.

TABLE 1

| physical values | unit | Example 1 | Example 2 | Example 3 | Example 4 | Example 5 | Example 6 | Example 7 | Example 8 | Example 9 |
|---|---|---|---|---|---|---|---|---|---|---|
| X in the formula [I] | non-dimensional | Na | Li | K | H | Na | Na | Na | Na | Na |
| n in the formula [I] | non-dimensional | 23 | 23 | 23 | 23 | 12 | 45 | 23 | 23 | 23 |
| content of sulfonic acid group | meq/g | 1.32 | 1.32 | 1.32 | 1.32 | 0.50 | 2.20 | 1.32 | 1.32 | 1.32 |
| SEM pore size | nm | N/A | N/A | N/A | N/A | N/A | N/A | N/A | N/A | N/A |
| chemical shift A when B = 5.24 ppm | ppm | 4.90 | 4.90 | 4.89 | 4.91 | 4.88 | 4.93 | 4.88 | 4.91 | 4.93 |
| B − A | ppm | 0.34 | 0.34 | 0.35 | 0.33 | 0.36 | 0.31 | 0.33 | 0.33 | 0.31 |
| logarithmic viscosity of polymer | dL/g | 1.43 | 1.43 | 1.43 | 1.43 | 1.56 | 1.34 | 1.43 | 1.43 | 1.43 |
| polymer concentration in the dope | % | 32.5 | 32.5 | 32.5 | 32.5 | 32.5 | 32.5 | 34.5 | 32.5 | 32.5 |
| air gap length | mm | 20 | 20 | 20 | 20 | 20 | 20 | 20 | 10 | 400 |
| salt water concentration in the coagulating bath | % | 3.5 | 3.5 | 3.5 | 3.5 | 3.5 | 3.5 | 3.5 | 3.5 | 3.5 |
| annealing treatment salt water concentration | wt % | 9.0 | 9.0 | 9.0 | 0 | 9.0 | 9.0 | 9.0 | 9.0 | 9.0 |
| temperature/time | °C./minutes | 98/20 | 98/20 | 98/20 | 98/20 | 98/20 | 98/20 | 98/20 | 98/20 | 98/20 |
| salt rejection rate (1.0 MPa) | % | 94.3 | 95.2 | 95.6 | 93.8 | 97.8 | 93.7 | 98.0 | 94.1 | 95.3 |
| filtration rate (1.0 MPa) | L/m²/day | 198 | 204 | 195 | 221 | 186 | 227 | 182 | 210 | 184 |
| outer diameter | μm | 165 | 163 | 165 | 164 | 166 | 165 | 169 | 172 | 156 |
| inner diameter | μm | 85 | 88 | 86 | 90 | 87 | 88 | 88 | 90 | 80 |
| yield strength | MPa | 6.3 | 6.2 | 6.3 | 5.8 | 7.5 | 5.3 | 8.6 | 6.6 | 5.3 |
| yield strength retaining rate (resistance to chlorine) | % | 99.6 | 99.3 | 99.7 | 98.9 | 99.6 | 99.0 | 99.4 | 99.5 | 98.7 |
| yield strength retaining rate (resistance to alkali) | % | 99.1 | 99.2 | 99.3 | 99.2 | 99.2 | 98.9 | 99.3 | 99.1 | 99.0 |

| physical values | unit | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|
| X in the formula [I] | non-dimensional | Na | Na | Na | Na | Na | Na | Na | — | — |
| n in the formula [I] | non-dimensional | 23 | 23 | 23 | 23 | 0.0 | 8.9 | 52.3 | — | — |
| content of sulfonic acid group | meq/g | 1.32 | 1.32 | 1.32 | 1.32 | 0.0 | 0.40 | 2.43 | — | — |
| SEM pore size | nm | N/A | N/A | N/A | N/A | 13 | N/A | N/A | — | — |
| chemical shift A when B = 5.24 ppm | ppm | 4.84 | 4.97 | 4.96 | 5.14 | 5.24 | 5.15 | 5.21 | — | — |
| B − A | ppm | 0.40 | 0.27 | 0.28 | 0.10 | 0 | 0.09 | 0.03 | — | — |
| logarithmic viscosity of polymer | dL/g | 1.43 | 1.43 | 1.43 | 1.43 | 1.68 | 1.67 | 1.16 | — | — |
| polymer concentration in the dope | % | 35 | 30 | 32.5 | 32.5 | 32.5 | 32.5 | 32.5 | 41 | 37 |
| air gap length | mm | 20 | 20 | 3 | 700 (heated) | 20 | 20 | 20 | 20 | 70 |
| salt water concentration in the coagulating bath | % | 3.5 | 3.5 | 3.5 | 3.5 | 3.5 | 3.5 | 7.0 | 0 | 0 |
| annealing treatment salt water concentration | wt % | 9.0 | 9.0 | 9.0 | 9.0 | 9.0 | 9.0 | 9.0 | 0 | — |
| temperature/time | °C./minutes | 98/20 | 98/20 | 98/20 | 98/20 | 98/20 | 98/20 | 98/20 | 60/40 | |
| salt rejection rate (1.0 MPa) | % | 98.3 | 82 | 88 | 42.7 | 0.5 | 25.7 | 58.2 | 96.0 | 96.8 |
| filtration rate (1.0 MPa) | L/m²/day | 165 | 256 | 241 | 8.9 | 1230 | 313 | 345 | 178 | 101 |
| outer diameter | μm | 163 | 166 | 173 | 149 | 164 | 167 | 165 | 173 | 165 |
| inner diameter | μm | 84 | 88 | 91 | 74 | 88 | 90 | 87 | 95 | 90 |
| yield strength | MPa | 9.8 | 4.2 | 6.1 | 4.9 | 7.2 | 7.0 | 2.8 | — | — |
| yield strength retaining rate (resistance to chlorine) | % | 99.7 | 98.8 | 99.3 | 99.1 | 98.5 | — | — | 97.5 | 10.4 |
| yield strength retaining rate (resistance to alkali) | % | 99.5 | 99.0 | 99.2 | 99.2 | 99.2 | — | — | 72.1 | 96.4 |

As will be apparent from the result of Table 1, Examples 1 to 9 well fulfill the practical level in terms of the salt rejection rate and the water permeability at the pressure of 1.0 MPa which is suitable for wastewater treatment. In Comparative Example 1, since the polymer concentration of the dope was high, the polymer density in the hollow fiber membrane was increased as a whole and, as a result, the water permeability lowered although the salt rejection rate increased. In Comparative Example 2, since the polymer concentration of the dope was lowered, the salt rejection rate became less than 93% and that is not suitable for wastewater treatment. In Comparative Example 3, the spinning was conducted by making the air gap as short as 3 mm and the result was that the salt rejection rate lowered and no expected properties were achieved. In Comparative Example 4, air gap was made 700 mm, the atmospheric temperature in the air gap was made 100° C. and the result was that there was noted a significant lowering in the salt rejection rate and in the water permeability. In Comparative Example 5, a hollow fiber membrane comprising non-sulfonated poly(aryl ether sulfone) was used and the result was that the pore size in the membrane became large and no salt rejection rate was achieved. In Comparative Examples 6 and 7, n of the formula [I] for them was made outside the lower limit and outside the upper limit, respectively, of the range of the present invention and the result was that, in both cases, although the water permeability was enhanced, the salt rejection rate was significantly inferior. In Comparative Example 8, a hollow fiber membrane comprising cellulose triacetate was used but the yield strength retaining rate concerning the resistance to alkali lowered and the result was that the resistance to alkali was inferior. In Comparative Example 9, a hollow fiber membrane comprising polyamide was used but the yield strength retaining rate concerning the resistance to chlorine significantly lowered and the result was that the resistance to chlorine was inferior.

Industrial Applicability

In a reverse osmosis membrane of the present invention, since both salt rejection rate and water permeability are achieved in a high level in spite of using the materials having excellent resistance to chemicals, the membrane is quite useful for the wastewater treatment.

The invention claimed is:

1. A reverse osmosis membrane for wastewater treatment comprising a sulfonated poly(arylene ether sulfone) polymer containing a constituting component represented by the following formula [I], characterized in that, in a proton nuclear magnetic resonance spectrum where water molecules in the membrane are measured using the reverse osmosis membrane in a water-containing state, the relation between the chemical shift A (ppm) of spectral peak top derived from bound water and the chemical shift B (ppm) of spectral peak top derived from bulk water satisfies $(B-0.36) \leq A < (B-0.30)$:

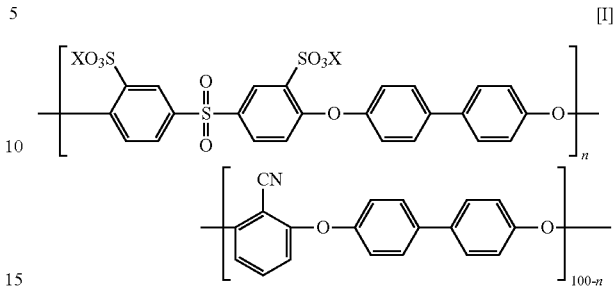

wherein X is H or a univalent cationic species and n is an integer of 10 to 50.

2. The reverse osmosis membrane according claim 1, wherein logarithmic viscosity of the sulfonated poly(arylene ether sulfone) polymer is 1.0 to 2.3 dL/g.

3. The reverse osmosis membrane according to claim 1, wherein content of sulfonic acid group in the sulfonated poly (arylene ether sulfone) polymer is 0.5 to 2.3 meq/g.

4. The reverse osmosis membrane according to claim 1, wherein no crystallization peak is observed in the observation by differential scanning calorimetry.

5. The reverse osmosis membrane according to claim 1, wherein the reverse osmosis membrane is a hollow fiber membrane having inner diameter of 70 to 100 μm and outer diameter of 140 to 175 μm.

6. The reverse osmosis membrane according to claim 5, wherein no pore having diameter of not less than 10 nm is observed in a wall thickness within 1 μm from the outer surface of the hollow fiber membrane.

7. The reverse osmosis membrane according to claim 5, wherein the yield strength in a wet state is from 4.5 MPa to less than 9.5 MPa.

* * * * *